Dec. 12, 1950  E. L. MASTERS  2,533,386
FERTILIZER SPREADER
Filed Aug. 19, 1946  3 Sheets-Sheet 1
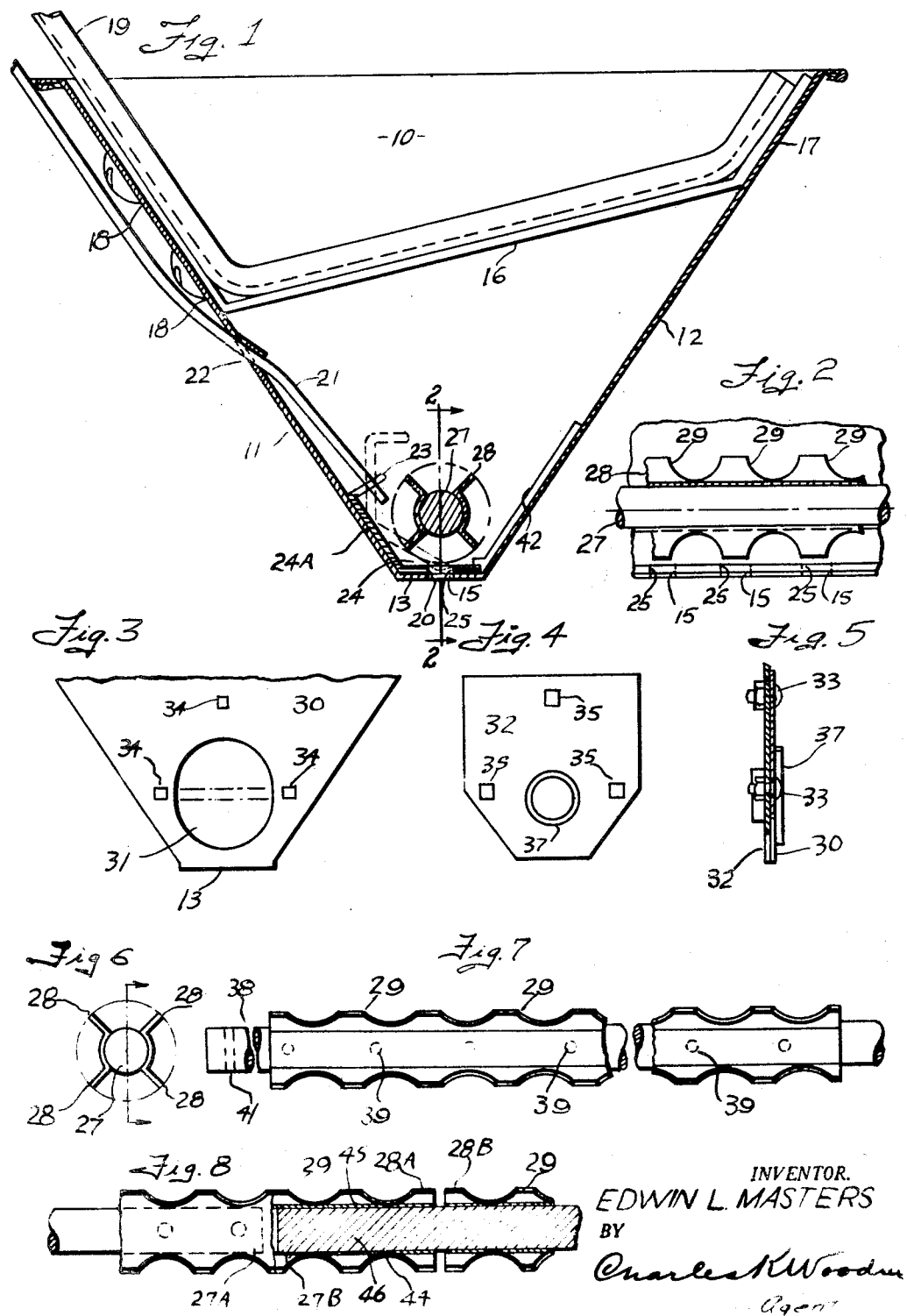
INVENTOR.
EDWIN L. MASTERS
BY
Charles K Wooden
Agent Dec. 12, 1950 — E. L. MASTERS — 2,533,386
FERTILIZER SPREADER
Filed Aug. 19, 1946 — 3 Sheets-Sheet 2
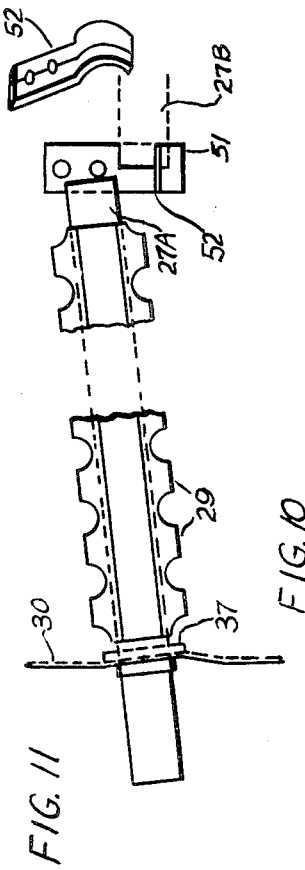
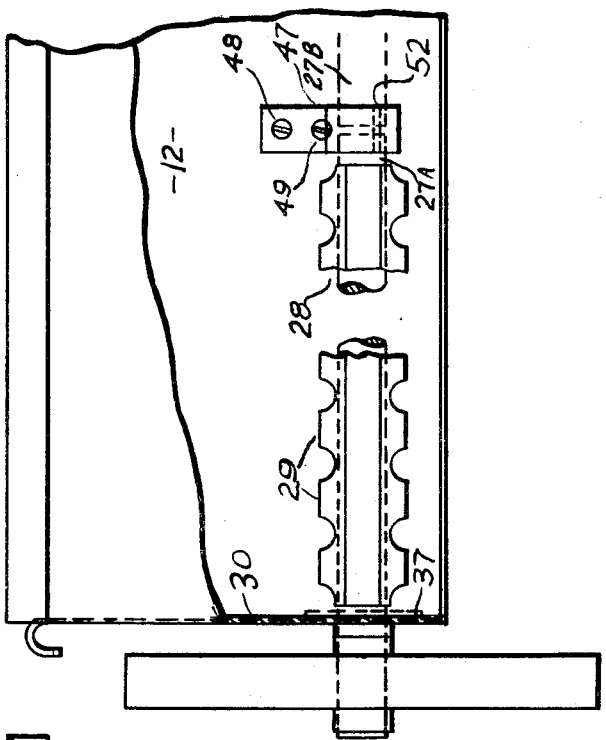
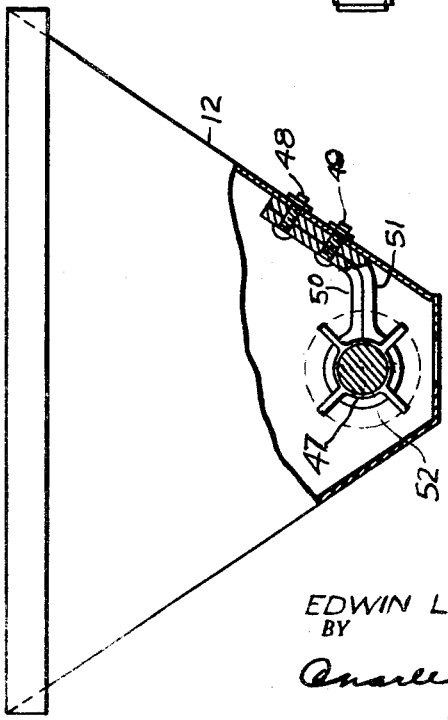
INVENTOR.
EDWIN L. MASTERS
BY
Charles K. Woodie
agent Dec. 12, 1950     E. L. MASTERS     2,533,386
FERTILIZER SPREADER Filed Aug. 19, 1946     3 Sheets-Sheet 3

INVENTOR.
EDWIN L. MASTERS
BY
Charles K Wooski
AGENT

Patented Dec. 12, 1950

2,533,386

UNITED STATES PATENT OFFICE 2,533,386

FERTILIZER SPREADER

Edwin L. Masters, Benton Harbor, Mich.

Application August 19, 1946, Serial No. 691,533

4 Claims. (Cl. 259—44)

This invention is related to fertilizer spreaders and is a continuation-in-part of my copending application, Serial No. 660,941, filed April 10, 1946, now Patent No. 2,513,810, patented July 4, 1950.

The improvements herein are particularly directed to the fertilizer agitator structure and to a mounting means for the agitator which permits the removal of the agitator without the removal of any threaded bolts which are subjected to the corrosive effect of the fertilizer.

Agricultural fertilizers are notorious for their difficult handling qualities. This is due to the corrosive effect on metals with which they come in contact. They also tend to absorb moisture and unless great care is exercised in clean removal, their corrosive tendencies are magnified by the cement like setting of the material. This corrosive property tends to destroy the utility of implements used for fertilizer distribution acting to bind moving parts together with an effectiveness approaching welding. Such fertilizers also tend to adhere to the moving parts of fertilizer spreaders and to build up over such parts to impair their function. Regulation of the rate of feed by the distributor becomes impossible unless such parts are clean and free to operate. Any projections or corners in fertilizer spreaders tend to aggravate the tendency of the fertilizer to adhere. The above characteristics of fertilizers make the regular cleaning of the spreading implement a positive necessity.

It is the object of the present invention to provide a fertilizer spreader which will avoid the tendency of the fertilizer to impair its operation by reason of corrosion or adhesion.

A further object of this invention is to provide agitator means for a fertilizer spreader having fewer parts likely to be impaired by the adhesion of the fertilizer.

A further object is to provide a fertilizer spreader having means whereby the agitator may be easily removed for cleaning.

A still further object of the invention is to provide combined agitator and wheel shaft for a fertilizer spreader having a differential action to enable the spreader to easily be turned and guided and to give better traction for rotation of the agitator means.

Other objects and benefits of the present invention will be seen in connection with the following description and drawings in which:

Fig. 1 is a transverse sectional view of a fertilizer spreader;

Fig. 2 is a fragmentary cross sectional view of the agitator showing its relation to bottom structure approximately as indicated by the line 2—2 of Fig. 1;

Fig. 3 is a fragmentary end elevational view of the spreader bin;

Fig. 4 is an elevational view of the spreader bin end plate;

Fig. 5 is a fragmentary cross sectional view of the spreader bin end wall and end plate;

Fig. 6 is a cross section of the agitator;

Fig. 7 is a fragmentary elevational view of the agitator;

Fig. 8 is a fragmentary elevational view of the agitator showing an optional structure;

Fig. 9 is a transverse sectional view of the spreader showing an agitator support structure;

Fig. 10 is a cross sectional view of the spreader showing the agitator structure;

Fig. 11 is a cross sectional view illustrating the method of removal of the agitator.

Figure 12:
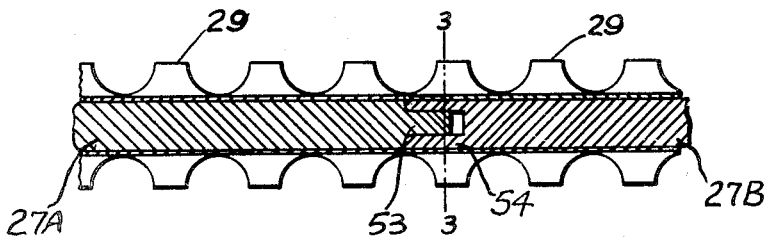
Fig. 12 is a transverse sectional view of a modified form of the agitator.

The fertilizer spreader shown in Fig. 1 is comprised of a wheeled bin or hopper 10. As shown in the drawing, the side walls 11 and 12 of the bin 10 are sloped to gravitate the fertilizer toward the relatively narrow floor portion 13. The floor 13 contains a series of circular apertures 15 through which the fertilizer is distributed. The bin 10 is braced for rigidity by the strap 16 which is welded or bolted to the bin walls at 17 and 18. The member 19 is a handle used for moving and guiding the bin and it overlays and is bolted to the brace 16 to give it strength and rigidity.

For the purpose of controlling the amount of flow of fertilizer from the bin, a metering means is provided. This means consists of an angle bar 20 and a lever 21. Lever 21 has its fulcrum at an aperture 22 which is provided in wall 11 of the bin. The lever 21 engages an ear portion 23 which projects from one leg of angle bar 20.

The side or leg 24 of the angle bar 20 lies flush with the bottom of bin 10 and has a series of apertures 25 to permit the passage of fertilizer. The leg 24A of angle bar 20 lies against the side wall 11 of the bin and is thereby held in proper slidable position in the bottom of the bin. The position of the angle bar is further fixed by a pair of brackets 42 which are fixed to the side wall 12 of the bin. It will be seen that upon sideward movement of the lever 21, the angle bar 20 can be slidably moved against the bottom of the bin from a position wherein apertures 25 register with apertures 15 and permit a maximum flow of fertilizer from the bin to a position wherein the apertures are completely out of register and no passage of fertilizer is permitted.

The agitator means of the device consists of the shaft 27 and the vanes 28. The shaft 27 serves also as an axle for the wheels of the distributor. One of such wheels is rotatably mounted on the shaft 27 while the other is fixed to the shaft so that forward movement of the spreader and rotation of the fixed wheel causes a like rotation of the shaft 27 and the agitator vanes 28. An optional construction for the agitator shaft is shown in Fig. 8 of the drawings and will be described hereinafter.

The vanes 28 are provided with spaced teeth 29, see Fig. 2, which extend for the entire length of the vanes and are so positioned as to revolve directly above the apertures 15 in the bottom of the bin. The rotation of the vanes 28 as above described, thus serves to agitate the fertilizer contained in the bin and to maintain it in a granular condition so that it can be impelled through the bin apertures 15 by the agitator teeth 29.

As has been stated by way of introduction, the corrosive and adhesive qualities of fertilizers make necessary a fertilizer structure wherein the several parts may be removed for cleaning. I will now describe the means which I utilize in the present form of my invention to prevent clogging of the spreader and to facilitate the cleaning operation.

Fig. 3 shows an end wall 30 of the fertilizer spreader bin. Adjacent the floor 13 of the bin and opposite the point at which the agitator is mounted within the bin, an opening 31 is provided in one end wall of the bin. Fig. 4 is a view of the end plate 32 which is designed to cover the opening 31 and to be bolted to it. Fig. 5 discloses the method by which carriage type bolts 33 are employed to fasten the end plate 32 to the wall 30. Numeral 34 designates bolt holes in the end wall 30 and numeral 35 designates those in the end plate 32. The bolt holes 34 and 35 are square and thus adapted to engage the square shank of the carriage bolts 33. The end plate 32 carries a bearing 37 for the axle portion 38 of the shaft 27. It will be noted that, as shown in Fig. 5, the bolts 33 project from the inner surface of the bin wall 30 toward the outside of the bin and that the threaded portions of such bolts are carried outside the bin and are thus free from the corrosive action of the fertilizer. When the end plate is removed, as has been described, the agitator can be removed from the bin through the opening 31, it first being necessary to remove the wheels from the shaft 27. After removal from the bin, the agitator can easily be cleaned or the adhering particles of fertilizer can be jarred or vibrated from the shaft and vanes by pounding. The metering bar 20 can now be removed for cleaning.

Figs. 6 and 7 illustrate the agitator assembly. The vanes 28 consist of a metal stamping so formed as to present a concave surface for engagement with the agitator shaft 27. The two parts of the agitator are then joined by spot welding. Numeral 39 designates several of such welds. Wheels for the device are mounted on the ends of shaft 27 as at 38 of Fig. 7. The shaft is bored at 41 to receive a pin which passes through the wheel hub and shaft 27 to lock the wheel to the shaft and cause the agitator and wheel to rotate together.

As has been described above, only one wheel of the spreader is fixed to the shaft 27 to give rotary motion to the agitator vanes 28. Better traction for driving the vanes 28 would be obtained by fixing both wheels to the shaft. This, however, results in awkward handling of the spreader when changes of direction are necessary. Fig. 8 illustrates an axle structure which permits a kind of differential action of the wheels and agitator vanes when both wheels of the spreader are fixed to the agitator shaft. This structure permits easy turning of the spreader and, at the same time, maintains rotation of the agitator. In this structure, the shaft is divided into the two sections 27A and 27B shown in Fig. 8. The agitator vanes are divided into sections 28A and 28B. The vane section 28A is spot welded to the shaft section 27A and the portion 44 extends beyond the shaft section. A sleeve bearing 45 is formed on the extension 44 into which an extension 46 of the shaft section 27B projects. It will thus be seen that each wheel of the spreader rotates a portion of the agitator and that differentials in speed of rotation of the wheels, as when the spreader is being turned, are provided for by the construction here described.

Figs. 9, 10 and 11 illustrate a further modification of the agitator structure. In this construction, like that of Fig. 8, a divided or separable axle and agitator shaft is employed. The inner ends of the shaft are supported in a bracket 47. This bracket supplies in part the function of the sleeve bearing 45 of Fig. 8. It is attached to the side wall 12 of the bin by the bolts 48 and 49 and is separable into two parts 50 and 51 as best seen in Fig. 9. Numeral 52 in Fig. 11 designates the point at which the sleeve portion separates. In this modification, the end plate structure above described is not employed. Fig. 11 illustrates the method of removing the agitator for cleaning purposes. Upon removal of the bolts 48 and 49, the bracket 47 can be disengaged from the shaft and removed from the bin. The inner end of the shaft section 27A can then be lifted to the position shown in Fig. 11 to clear the remaining section of the shaft 27B. This movement of shaft section 27A is permitted by a resulting distortion of the end wall 30, as shown in the drawing, the end wall being of relatively light gauge sheet metal. The agitator can then be withdrawn from the bearing 37 and removed for cleaning.

Figure 13:
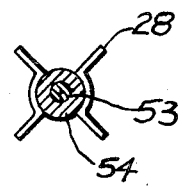
Fig. 13 is a cross sectional view of the agitator on the line 3—3 of Fig. 12.

The agitator structure shown in Fig. 12, like that shown in Figs. 8, 9 and 10, is designed to permit a differential action of the agitator shaft. In this structure, the separable shaft 27A is provided with a spindle 53 at the point of separation. A sleeve portion 54 is formed on shaft section 27B which surrounds the spindle 53. The spindle 53 and sleeve 54 are so proportioned that the parts are free to rotate and give the differential action above described and, at the same time, prevent the entrance of fertilizer into the sleeve with consequent interference with such rotation. The cross section view in Fig. 13 shows the relationship of the parts.

Figure 14:
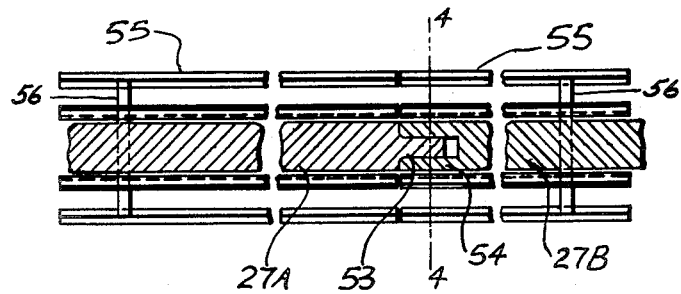
Fig. 14 is a view, partly in section, showing a modified form of agitator structure.
Figure 15:
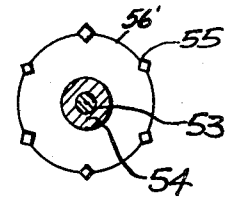
Fig. 15 is a cross sectional view of the agitator shown in Fig. 14 taken on the line 4—4 of Fig. 14.

In Fig. 14, a further modification of the agitator structure is shown. In this structure, the agitating means consist of rods or bars 55 mounted on circular discs 56. This structure embodies the separable shaft above described in connection with Fig. 12. The bars 55 extend from end to end of the agitator shaft sections 27A and 27B within the bin and function like the vanes 28 of Fig. 12 to maintain the fertilizer in granular condition to facilitate its passage from the bin. The numeral 56' indicates the point at which the bars 55 are separated for independent rotation with the respective sections of the shaft.

From the foregoing description, it will be apparent that the structure of the fertilizer spreader is adapted for effective operation and at the same time may be quickly and easily cleaned. The structure shown and described in my copending application necessitated disassembly of the vanes from the agitator shaft to permit removal of the metering bar 20 from the bottom of the bin. It was necessary to employ bolts for the purpose which were acted upon by the fertilizer making the unbolting operation difficult. Further, it was necessary to fix these bolts using tools inserted through the metering apertures in the bottom of the bin. Such a procedure was difficult and awkward and is completely obviated by the structure employed in the present form of the invention. Further, where the welding method is substituted for the bolts, the agitator is less likely to become clogged by the cohesion of fertilizer to its parts. The bolt heads and nuts were a source of difficulty in this regard in the structure shown in my copending application, Serial No. 660,941.

Having described my invention, I wish to point out that modifications of the structure are possible without departing from the spirit of the invention. I do not wish to be limited except by the scope of the appended claims.

What I claim is:

1. In a fertilizer spreader, a hopper having discharge openings in its bottom, agitating means comprising aligned toothed sections in said hopper adjacent said discharge openings, one of said sections carrying a sleeve bearing, a pair of aligned shafts in said hopper for supporting said agitating sections with one shaft supported in said sleeve bearing, means for securing said shafts to said agitating sections whereby one shaft will have relative movement with respect to the other shaft, and said shafts being adapted to rigidly support ground wheels at the ends of said hopper.

2. In a fertilizer spreader, a hopper having discharge openings in its bottom and end bearings, an agitator shaft section extending through one end bearing and into said hopper, agitating means in said hopper secured to said shaft and extending beyond the inner end of said shaft, a sleeve bearing in the extended portion of said agitating means, a shaft section extending through the other end bearing and into said sleeve bearing, agitating means carried by this second shaft section, the outer ends of said shaft sections being adapted for rigid securement to ground wheels.

3. In a fertilizer spreader, a hopper having discharge openings in its bottom agitating means in said hopper comprising separate sections, a separate shaft for driving each section, one section carrying a bearing for one of said shafts, a ground wheel secured to each shaft and means for connecting said shafts to said sections whereby one shaft may move relative to the other shaft.

4. In a fertilizer spreader, a hopper having discharge openings in its bottom, a pair of aligned shafts extending into said hopper, means for supporting said shafts for differential movement, a pair of aligned agitating devices surrounding said shafts with one secured to each shaft and one carrying a bearing for one of said shafts, and ground wheels secured to the outer ends of said shafts.

EDWIN L. MASTERS.

REFERENCES CITED

The following references are of record in the file of this patent:

UNITED STATES PATENTS

| Number | Name | Date |
|---|---|---|
| 140,317 | Sweet | June 24, 1873 |
| 515,941 | Savage | Mar. 6, 1894 |
| 1,241,390 | Jackson | Sept. 25, 1917 |
| 1,750,710 | Fain | Mar. 10, 1930 |
| 1,965,483 | Woods | July 3, 1934 |
| 2,258,921 | Young et al. | Oct. 14, 1941 |
| 2,278,051 | Ambrose | Mar. 31, 1942 |
| 2,350,107 | Gandrud | May 30, 1944 |
| 2,359,995 | Korum | Oct. 10, 1944 |
| 2,386,493 | Moresca | Oct. 9, 1945 |

FOREIGN PATENTS

| Number | Country | Date |
|---|---|---|
| 394,489 | France | Jan. 25, 1909 |